July 25, 1933.  J. B. GOLDSBOROUGH  1,919,836
JACKETED APPARATUS FOR CONVERTING ORGANIC MATTER
Filed Feb. 23, 1928    4 Sheets-Sheet 1
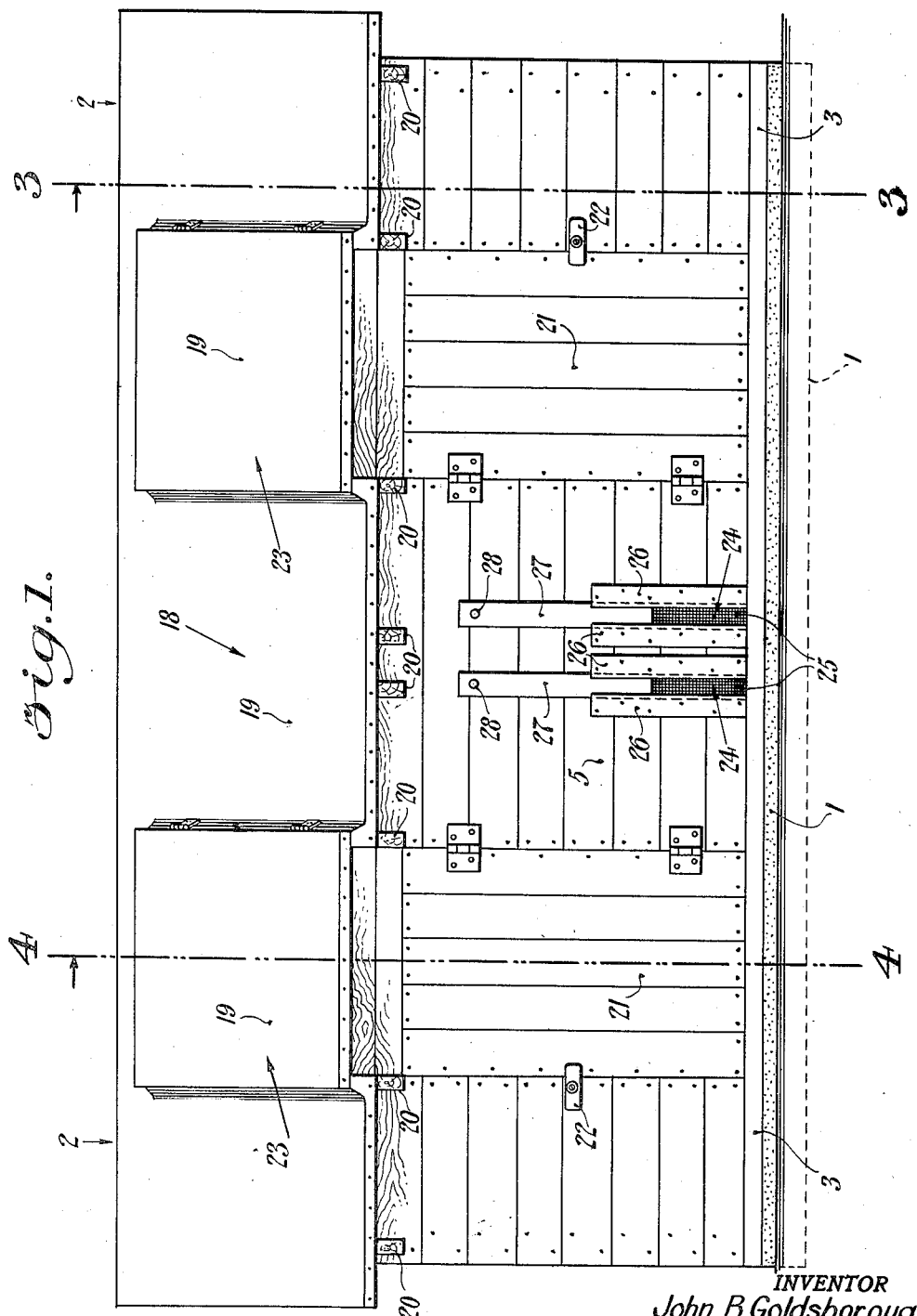
INVENTOR
John B Goldsborough
BY *Moakley & Gill*
ATTORNEYS July 25, 1933. J. B. GOLDSBOROUGH 1,919,836
JACKETED APPARATUS FOR CONVERTING ORGANIC MATTER
Filed Feb. 23, 1928 4 Sheets-Sheet 2
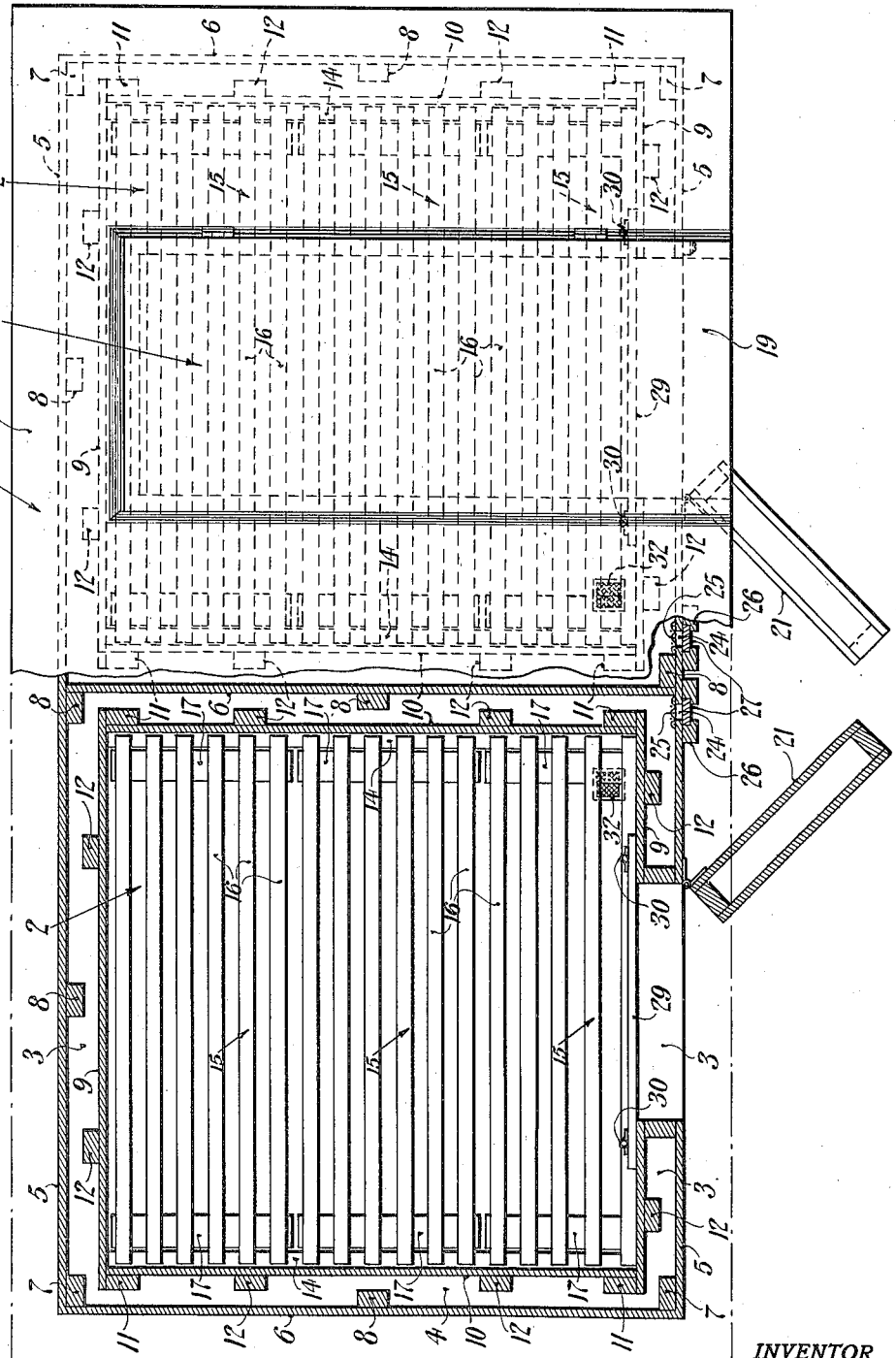
INVENTOR
John B. Goldsborough
BY Moakley & Gill
ATTORNEYS

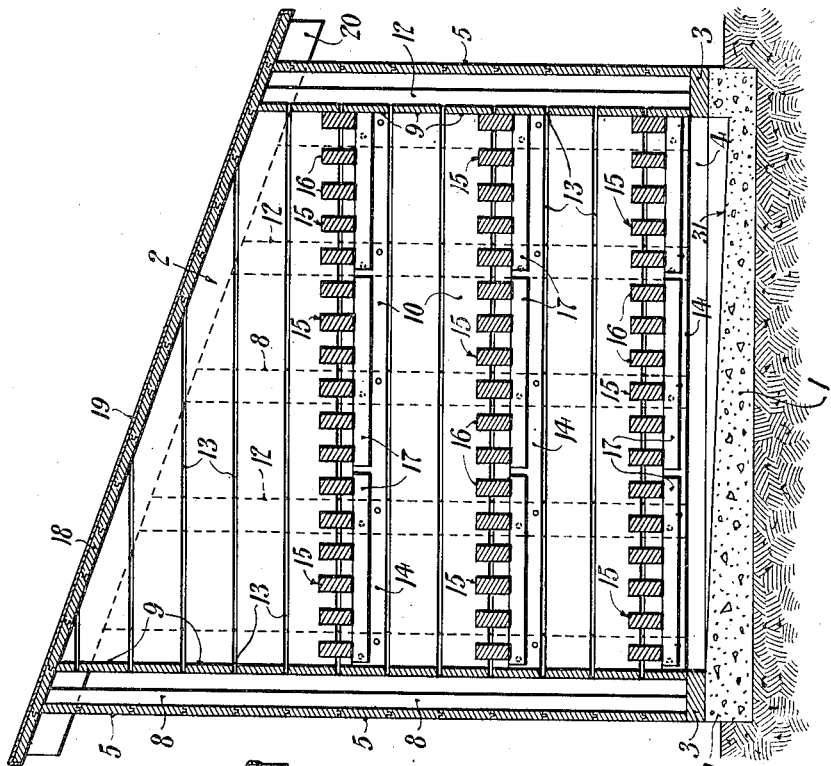
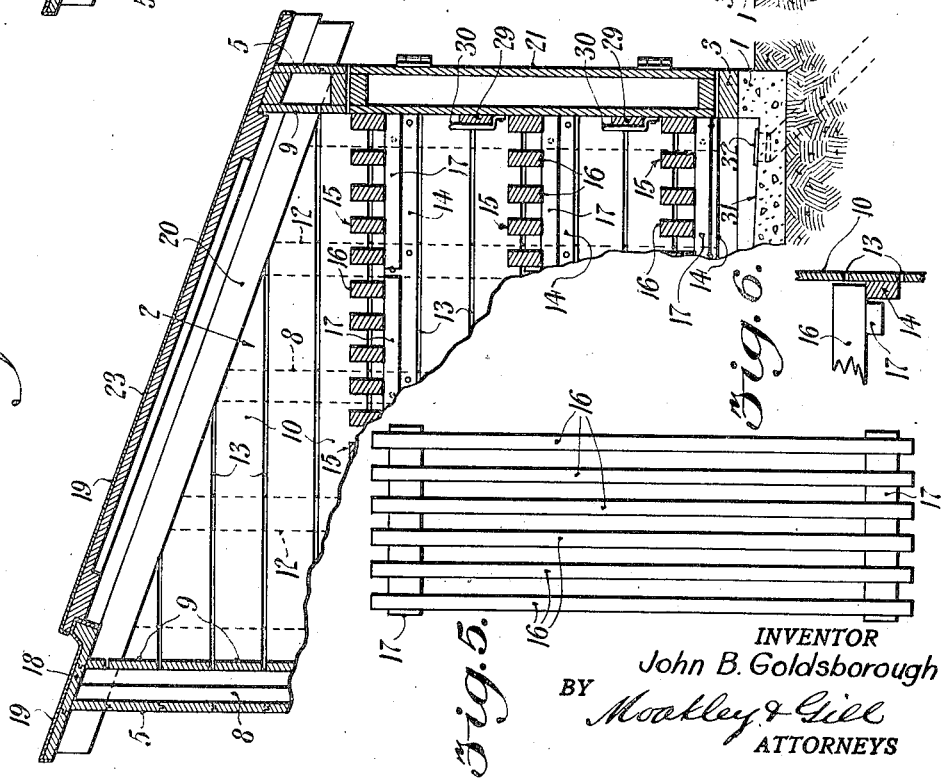

July 25, 1933. J. B. GOLDSBOROUGH 1,919,836
JACKETED APPARATUS FOR CONVERTING ORGANIC MATTER
Filed Feb. 23, 1928 4 Sheets-Sheet 4
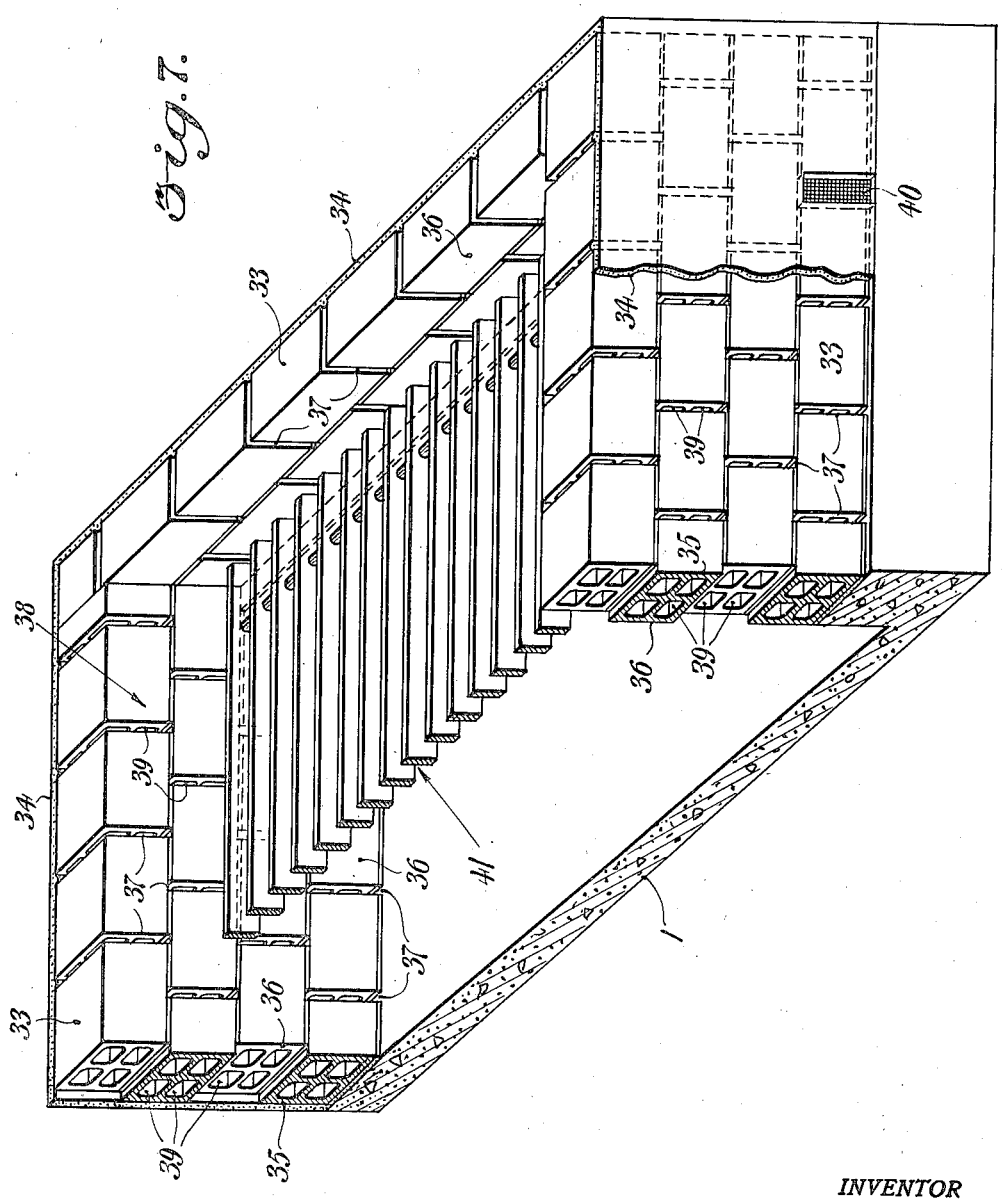
INVENTOR
John B. Goldsborough
BY Moakley & Gill
ATTORNEYS Patented July 25, 1933

1,919,836

UNITED STATES PATENT OFFICE

JOHN B. GOLDSBOROUGH, OF CROTON-ON-HUDSON, NEW YORK, ASSIGNOR TO UNDER-PINNING AND FOUNDATION COMPANY, OF NEW YORK, N. Y., A CORPORATION OF NEW YORK

JACKETED APPARATUS FOR CONVERTING ORGANIC MATTER

Application filed February 23, 1928. Serial No. 256,460.

This invention relates to the disposal and utilization of waste organic matter, such as garbage, which contains nitrogenous constituents that are valuable for fertilizing the soil. A purpose of the present invention is to transform such organic matter into a harmless and inoffensive mass by the action of micro-organisms of fermentation, and through new and improved means, whereby the resulting product is an organic fertilizer peculiarly suited to the needs of agriculture.

Various difficulties in carrying out the fermentation process present themselves among which is the need of preserving a temperature of sufficient degree to support the life of the micro-organisms of fermentation, without the danger of acquiring a temperature sufficiently high to destroy them. This would be particularly dependent upon constant care and watchfulness were artificial heating means to be employed which would require frequent regulation, and in carrying out the present invention the heat is derived from the fermentation, during the early stages of which there is a rapid rise of temperature of the waste mass due to the increase of the micro-organisms of fermentation contained therein. Lack of uniformity of fermentation throughout the mass in a fermenting chamber, due to the outdoor location of such chamber and its subjection to relatively low external temperatures, at times, results in retardation of the fermentation process in that portion of the mass that lies adjacent to the chamber walls. It is accordingly an object to avoid this disadvantage by an improved construction in which there is a conservation of the temperature derived by the multiplication of micro-organisms of fermentation, and its retention exteriorly of an inner waste material containing chamber, as well as in the interior thereof.

Further regulation of the temperature exterior to such inner chamber is also provided for, and an air circulation throughout the waste organic matter in the chamber is had that nullifies any tendency toward fermentation retardation, and which maintains the temperature within limits between which there is a promotion of the development of complementary micro-flora favorable to agriculture.

An advantage of merit lies in the inexpensive construction of a housing containing one or more inner fermentation cells protected from undesirably low exterior temperatures, and in which there is an air jacket surrounding individual cells. There is such an arrangement that there is ingress for exterior air and a heat regulation of such air resulting from the propagation of micro-organisms of fermentation coupled with a system of penetration of the mass by modified air which results in a substantially uniform permeation of the waste organic mass. The separation of the waste organic mass in a single cell into separated portions offers access of the air to what would in an undivided mass be a substantially impermeable core of waste material.

The particular nature of the invention as well as other objects and advantages thereof will appear more clearly from a description of a preferred embodiment, as shown in the accompanying drawings in which Fig. 1 is a front elevation of a housing containing a pair of fermentation cells with the means of access thereto shown closed;

Fig. 2 is a view of the housing shown in Fig. 1 approximately one-half of which is shown in plan, the remainder being shown in horizontal section through one of the fermentation cells and its surrounding air jacket;

Fig. 3 is a vertical section through one cell of the housing, being taken on the line 3—3 of Fig. 1;

Fig. 4 is a similar sectional view taken on the line 4—4 of Fig. 1, part of the section being broken away;

Fig. 5 is a plan view of one of the removable grates;

Fig. 6 is a fragmentary side view of an end portion thereof, and

Fig. 7 is a fragmentary perspective view of another form of disposal plant.

Referring to the drawings, 1 indicates a concrete base which serves as a foundation and floor for a plurality of fermentation cells 2, which may be of any desired number. Longitudinal and transverse sills 3 and 4, respectively, lie on the concrete base 1, and support the superstructure, which comprises the inner fermentation cells 2 and jacket-forming walls 5 and 6 of closely joined sheathing, the former extending longitudinally of the superstructure and the latter transversely thereof. While the walls 5 and 6 may be constructed of any suitable material and in any desirable manner, they have been shown as being built of snugly inter-fitted boards having tongue and groove joints. These boards are secured to corner posts 7 and intermediate studs 8.

Inset from the outer jacket-forming walls 5 and 6 are the inner walls or sides 9 and 10 of the fermentation cells proper, which are composed of boards nailed or otherwise fastened to corner posts 11 and intermediate studs 12. The boards of the walls 9 and 10 are spaced from each other so as to form vertically separated horizontally disposed ventilation passages 13. Thus, the fermentation cells have slatted walls ventilated substantially throughout their areas. At different heights, the walls 10 of the fermentation cells are provided with horizontal ledge-forming wooden or other strips 14 extending along these walls from the front toward the rear of the cells. In each fermentation cell, wooden grate sections 15 span the space between the ventilated walls 10 and have horizontal slats 16 the opposite ends of which rest on the strips 14 of opposing walls 10, the slats of each section being bound together near their opposite ends by battens 17, as shown in Figs. 5 and 6. A plurality of grate sections 15 are supported side by side in relative closeness on each pair of wall strips 14 that are at the same level to make a complete grate thereat. Such sectional grates are arranged in tiers in the individual fermentation cells.

As shown in Figs. 1 and 4, the housing as a whole is provided with a sloping rain and snow shedding roof 18, provided with roofing 19 that is impervious to the weather, the roof being supported on rafters 20. At the front of the housing are doorways normally closed by hinged doors 21 that may be kept in closed position by any suitable fastening means 22. In the roof, and conveniently aligned with the doors 21, are other hinged doors 23 covered with weather resisting roofing 19.

Each fermentation cell is seen, in view of its description, to be an interior refuse receptacle formed of ventilated walls and a tier of shelf-like grates, each of the latter being adapted to support a portion of the total bulk of the waste organic matter that the cell is capable of holding. Accordingly, the total bulk of waste matter in the cell is held in separated heaps, one more or less spaced above the other, in such amounts as to propogate micro-organisms of fermentation, and so as to be penetrable by the air that is heated by the multiplied micro-organisms.

Inasmuch as the outer housing walls 5 and 6 are appropriately spaced from the ventilated walls 9 and 10 of the fermentation cells 2, there is a resulting air jacket surrounding each fermentation cell. An air port 24 establishes communication between the exterior atmosphere and the interior of the air jacket which surrounds each fermentation cell 2. The air ports 24 are protected by screens 25, which prevent entrance of rubbish, or other substances, into the air jackets where it might interfere unduly with the circulation of the air.

Since the air in and between the individual or separated heaps of waste organic matter is of higher temperature than that entering from the exterior through ports 24, a circulation of air is stimulated not only through the heaps of waste organic matter in each cell but also about the outside thereof, due to the air jacket surrounding each cell. A uniform permeation of the waste organic mass by the heated travelling air therefore, transpires, thus propagating the micro-organisms of fermentation. Each fermentation cell having but one air port, the air circulation therein is slow, whereby the air is readily heated by the multiplied micro-organisms of fermentation, and being relatively sluggish in its movement the air between the inner walls 9 and 10 of the cells proper and the outer walls 5 and 6 of the housing is to a measure an approximation of the dead space conditions that exist between closely parallel walls. This tends to insulate the enclosed fermentation cells 2 in their entirety from the external atmosphere, so that they are protected therefrom when it is materially lower than the interior temperature of the cells.

The restricted circulation of air within and about the fermentation cells 2 effects an upward gaseous percolation of air modified by the rapid propagation of micro-organisms of fermentation within appropriate heat limits through substantially all of the waste organic matter, promoting the development of micro-flora which is beneficial to agriculture.

As shown in the drawings, the fermentation cells 2 are isolated with individual air jackets, whereby each cell is thoroughly effective independently of any other cell. If, then, an adjacent cell is not in use it in nowise detracts from an operating cell next to it. Other arrangements may, of course, be made where, with proper design, two or more cells may be in operative combination, and other cells be segregated therefrom.

Varying conditions from torrid summer weather to that of frigid winter are offset in the refuse disposal apparatus illustrated and described herein by suitable valves. As shown in Figs. 1 and 2, these valves may be easily constructed by securing to the outer housing wall 5 vertically disposed guides 26 on opposite sides of each air port 24, and fitting slidable valve members 27 between pairs of such guides to be moved over the air ports. Frictional fits may be sufficient to position the valves in any desired position to regulate the correlation of the external and internal temperatures, but pins or latches 28 in the upper portions of the valve members 27 may be inserted in depressions back of them to hold the valve members as wished.

In the operation of the waste disposal apparatus, the door 21 of a cell 2 is swung open and the lowest grate sections 15 are put into place to form a bottom grate substantially of the same area as the interior of the fermentation cell 2. Organic waste material is then thrown thereupon in an amount that will be penetrable by the interior air during the subsequent operation of the apparatus. To prevent accidental spilling of the waste matter into the doorway, a retaining shield or board 29, or a plurality of them, is placed across the doorway, its opposite ends being supported and retained in brackets 30 disposed at opposite sides of the door opening, so as to be out of the way. A barrier to a sliding flow of waste material is thus established.

In similar manner, a second grate of grate sections 15 is formed and loaded with a proper amount of waste organic matter, and restrained from spilling by another shield or board 29. Likewise, a third grate of sections 15 is positioned above the second, but this is filled through the opening of the roof door 23. There is, in consequence, a plurality of waste matter receiving compartments arranged vertically one above the other.

Other fermentation cells 2 are charged in the same manner, after which the doors 21 and 23 are tightly closed, and the air ports 24 are properly regulated by the positioning of the valve members 27.

There is no undue haste in the dehydration of the waste organic matter, which is soggy when placed into the cells, although ultimately it shrinks and dries into a form in which it is suitable for use as an agricultural fertilizer. Watery drippings from the waste material in the fermentation cells find their way to the floor 1 in each fermentation cell 2. As is discernable in Figs. 3 and 4, the concrete floor 1 of each fermentation cell slopes, as at 31, to carry the accumulated fluid off through a drain 32.

After completion of the treatment the doors of the fermentation cells are opened, and the product is removed therefrom, and carried away for storage elsewhere, new supplies of waste organic matter being supplied to the fermentation cells, after which the hereinbefore described process is repeated. The type of housing shown is especially well suited to smooth and easy operation either on a small or large scale. The housing is sufficiently low to permit ready access to the interior of the fermentation cells from the side and roof of the housing. Where used as a community waste disposal plant, there may be rows of housings containing many cells, with driveways between the housings through which loaded vehicles may pass in line, each contributing its load to one or more fermentation cells. Moreover, no machinery for handling the waste matter is needed, as this is readily attended to by the workmen normally employed. Therefore, the overhead expense is kept very low, the type of employee is one of the least expensive, and the cost of erection is likewise relatively small.

While the invention has been shown as being embodied in a largely wooden structure, it is to be understood that any suitable materials may be employed in constructing the plant. For example, as shown in Fig. 7, hollow tile or concrete blocks 33 may be employed and assembled in the staggered joint arrangement common in masonry, except for an absence of mortar between the vertical ends of the hollow block 33 and the presence of an outer sheathing of cement or concrete 34. More simply, the vertical spaces between the blocks may be completely filled with mortar at the outer walls only of the blocks. With such an arrangement, there will be a housing having solid outer walls 35, and inner walls 36 ventilated substantially throughout their areas by the vertical vents 37 resulting from the absence of mortar between the ends of the blocks, forming a ventilated fermentation chamber 38. The hollow space in the blocks forms an air jacket 39 around the fermentation chamber and is in communication with the interior thereof. The outer sheathing may be interrupted at certain inlets ports 40 to effect a communication between the exterior atmosphere and the interior of the jacket and fermentation cell or cells. Doors giving access to such cells are present in such construction, and tiers of iron grates 41 may be used.

It will, of course, be understood that the various other departures from the illustrated forms of the invention, as well as various other arrangements and adaptations, may be indulged in without departing from the spirit of the invention as defined by the appended claims.

What I claim is:

1. In apparatus for converting organic matter, an exterior housing having air-confining walls forming separate housing chambers, fermentation cells in the different chambers having upright, ventilated sides sectional removable grates in said cells forming with the sides of the latter ventilated compartments for holding heaps of organic matter, there being openings from the exterior of said housing into the compartments of the different fermentation cells, closures for said openings, and means to effect a restrained air circulation through said cells.

2. In apparatus for converting organic matter, an exterior housing having a roof and air-confining walls forming a plurality of isolated chambers, fermentation cells in the different chambers having upright sides separated from the walls of said chambers whereby air jackets extend around the individual fermentation cells, sectional removable grates arranged in tiers in the fermentation cells forming compartments in each cell the compartments having ventilated upright sides and horizontal walls and being adapted to hold heaps of organic matter, there being openings from the exterior of the housing into the organic matter holding compartments and into said jackets, closures for the openings to the compartments, and air regulating means for the openings to the air jackets.

3. In apparatus for converting organic matter, an interior fermentation cell comprising ventilated upright sides and a horizontal grate extending therebetween, an exterior housing having air-confining walls spaced from the walls of said cell and forming an air jacket about the cell, there being an opening from the exterior of said housing into said cell, a closure for said opening adapted to be moved away therefrom, a removable barrier positioned across said opening adjacent the front of said grate and retaining means for said barrier.

4. In apparatus for converting organic matter, a housing chamber having air-confining walls, a fermentation cell in said chamber having sides with horizontally extending ventilating openings having greater horizontal than vertical dimensions and spaced from the sides of said chamber and removable horizontal grates at different levels in said cell and separating it into compartments, means for admitting air from the outside of the housing chamber to said compartments and means to control the circulation of air through said cell.

JOHN B. GOLDSBOROUGH.